US007599450B2

(12) United States Patent
Yang et al.

(10) Patent No.: US 7,599,450 B2
(45) Date of Patent: Oct. 6, 2009

(54) PATTERN-DEPENDENT EQUALIZATION AND DETECTION

(75) Inventors: Xueshi Yang, Pittsburgh, PA (US); Erozan Kurtas, Pittsburgh, PA (US)

(73) Assignee: Seagate Technology, Scotts Valley, CA (US)

( * ) Notice: Subject to any disclaimer, the term of this patent is extended or adjusted under 35 U.S.C. 154(b) by 762 days.

(21) Appl. No.: 10/771,813

(22) Filed: Feb. 3, 2004

(65) Prior Publication Data

US 2005/0169412 A1 Aug. 4, 2005

(51) Int. Cl.
*H03D 1/00* (2006.01)
(52) U.S. Cl. ...................................... 375/340
(58) Field of Classification Search ................. 375/230, 375/350, 354, 340, 229, 231, 232, 233, 234, 375/235, 236
See application file for complete search history.

(56) References Cited

U.S. PATENT DOCUMENTS

| 5,644,597 | A * | 7/1997 | Ueda ............................ 375/232 |
| 6,201,839 | B1 | 3/2001 | Kavcic et al. ................ 375/341 |
| 6,438,180 | B1 | 8/2002 | Kavcic et al. ................ 375/341 |
| 6,460,150 | B1 * | 10/2002 | Cideciyan et al. ............ 375/341 |
| 6,810,168 | B1 * | 10/2004 | Feng et al. ..................... 385/24 |
| 7,107,514 | B1 * | 9/2006 | Oberg et al. .................. 375/233 |
| 2002/0181549 | A1 * | 12/2002 | Linnartz et al. ............... 375/142 |
| 2003/0138040 | A1 * | 7/2003 | Rouphael et al. ............. 375/233 |
| 2003/0142740 | A1 * | 7/2003 | Haunstein et al. ............ 375/233 |
| 2004/0091069 | A1 * | 5/2004 | Liu et al. ..................... 375/350 |
| 2004/0136717 | A1 * | 7/2004 | Zhang et al. .................. 398/85 |
| 2004/0156459 | A1 * | 8/2004 | Kwon et al. .................. 375/350 |
| 2005/0031061 | A1 * | 2/2005 | Ojard et al. .................. 375/346 |
| 2005/0169412 | A1 * | 8/2005 | Yang et al. .................. 375/350 |
| 2006/0139646 | A1 * | 6/2006 | DiFoggio ..................... 356/436 |

OTHER PUBLICATIONS

Moon, J. and Park, J. "Pattern-Dependent Noise Prediction in Signal-Dependent Noise," IEEE Journal on Selected Areas in Communications, vol. 19, No. 4, pp. 730-743 (Apr. 2001).
J. Coker et al. "Noise-Predictive Maximum Likelihood (NPML) Detection," IEEE Transactions on Magnetics, vol. 23, No. 1, pp. 110-117 (Jan. 1998).
J. Caroselli et al. "Improved Detection for Magnetic Recording Systems with Media Noise," IEEE Transactions on Magnetics, vol. 33, No. 5, pp. 2779-2781 (Sep. 1997).
Kavcic, Aleksandar "Decision Feedback Equalization in Channels with Signal-Dependent Media Noise," IEEE Transactions on Magnetics, vol. 37, No. 4, pp. 1909-1911 (Jul. 2001).

(Continued)

*Primary Examiner*—Khai Tran
(74) *Attorney, Agent, or Firm*—Westman, Champlin & Kelly, P.A.

(57) ABSTRACT

A system for pattern dependent equalization has an equalizer bank and a detector. The equalizer bank has a plurality of equalizers, which are each tuned to a selected data pattern. The detector may be a standard sequence detector or a modified Viterbi detector, which calculates the branch metric using a pattern dependent equalized output and a pattern-dependent target. A method of decoding data uses a pattern dependent equalizer bank. The pattern dependent equalizer bank processes a segment of a bit sequence to produce an equalized pattern-dependent output for each equalizer in parallel. The detector then detects the bit sequence using the branch metric calculation to select the smallest accumulated path metric.

8 Claims, 6 Drawing Sheets

OTHER PUBLICATIONS

Nair, S.K.; Moon, J.; "Nonlinear Equalization for Data Storage Channels" IEEE International Conference on Communications, ICC '94, SUPERCOMM/ICC '94, Conference Record, Serving Humanity Through Communications, vol. 1, pp. 250-254 (May 1994).

Forney, Jr. David G, "Maximum-Likelihood Sequence Estimation of Digital Sequences in the Presence of Intersymbol Inteference," IEEE Transactions on Information Theory, vol. IT-18, No. 3, pp. 363-378 (May 1972).

Moon, J. and Zeng, W. "Equalization for Maximum Likelihood Detectors," IEEE Transactions on Magnetics, vol. 31, No. 2, pp. 1083-1088 (Mar. 1995).

Kavcic, Aleksandar, "A Signal-Dependent Autoregressive Channel Model," IEEE Transactions on Magnetics, vol. 35, No. 5, pp. 2316-2318 (Sep. 1999).

Moon, J. and Carley, R. "Performance Comparison of Detection Methods in Magnetic Recording" IEEE Transactions on Magnetics, vol. 26, No. 6, pp. 3155-3172 (Nov. 1990).

Glave, F, "An Upper Bound to the Probability of Error Due to Intersymbol Inteference for Correlated Digital Signals," IEEE Transactions on Information Theory, vol. IT-18, No. 3, pp. 356-363 (May 1972).

Kavcic, A. and Moura, J. "The Viterbi Algorithm and Markov Noise Memory," IEEE Transactions on Information Theory, vol. 46, No. 1, pp. 291-301 (Jan. 2000).

Uehara, G. and Gray, P. "Parallelism in Analog and Digital PRML Magnetic Disk Read Channel Equalizers", IEEE Transactions on Magnetics, pp. 1-6 (Nov. 1994).

Nair, S.K.; Moon, J.; "Hardware-Efficient Nonlinear Equalizer and Its Performance" 1995 IEEE International Conference on Communications, ICC '95 Seattle, Gateway to Globalization, vol. 1, pp. 653-657 (Jun. 1995).

Dumer, I. and Krichevkskiy, R. "Soft-Decision Majority Decoding of Reed-Muller Codes," vol. 46, No. 1, pp. 258-264 (Jan. 2000).

Nair, S.K.; Moon, J.; "Simplified Nonlinear Equalizers" IEEE Transactions on Magnetics, vol. 31, No. 6, pp. 3051-3052.

Nair, S.K.; Moon, J.; "Improved Equalization for Digital Recording Using Nonlinear Filtering and Error Confinement" IEEE Transactions on Magnetics, vol. 30, No. 6, pp. 4221-4223 (Nov. 1994).

Nair, S.K.; Moon, J.; "A Theoretical Study of Linear and Nonlinear Equalization in Nonlinear Magnetic Storage Channels" IEEE Transactions on Neural Networks, vol. 8, No. 5 pp. 1106-1118 (Sep. 1997).

* cited by examiner

PATTERN-DEPENDENT EQUALIZATION AND DETECTION

CROSS-REFERENCE TO RELATED APPLICATION(S)

None.

BACKGROUND OF THE INVENTION

The present invention relates to a system for combating pattern-dependent media noise in a signal. More particularly, the present invention relates to a system for reducing the total signal noise seen by a detector prior to detection using a pattern dependent equalization scheme.

Signals transmitted over a channel can be altered by noise or by the transmission medium, resulting in a distorted signal. The term "channel" is used herein to refer to a physical medium for transmitting data or for storing data. In data transmission, the channel can be a copper wire, an optical fiber, or air. In data storage, the channel can be a magnetic or optical medium.

Inter-symbol interference (ISI) refers to a signaling phenomenon where symbols blur into one another. Specifically, the transmission medium creates a "tail" of energy that lasts longer than intended, causing the transition edges between symbols in the signal to be less than precise. Thus, ISI describes the noise condition where energy from one symbol bleeds into adjacent symbols in a sequence. The received signal is then the sum of the distorted signals, making the effected symbol more susceptible to incorrect interpretation at the receiver.

Magnetic and optical recording channels are known to experience ISI. As the density of the recording media has increased, the rate of transitions within the recording signals has also increased, leading to more severe ISI because the frequency allows less time for the signal to settle between transitions. Conventionally, efforts to reduce or eliminate ISI using data independent equalization techniques sometimes cause noise enhancement due to the mismatch between the channel response and the equalization target. In other words, conventional channel equalization techniques tend to amplify interference at certain frequency ranges present at the receiver input.

Partial response maximum-likelihood (PRML) detection was advanced to reduce the noise enhancement resulting from equalization by allowing for a controlled amount of ISI. PRML detection schemes have been shown to achieve near optimal performance for additive white Gaussian noise (AWGN) channels when an appropriate Partial Response (PR) target is chosen. However, at higher recording densities (such as where the pulse width at the 50% amplitude point is equal to or greater than twice the period of the signal), the performance of the PRML detection scheme is severely degraded in media noise dominated channels.

In high area density recording systems, media noise may be responsible for more than 90% of the total noise power. Typically, media noise arises from fluctuations in the magnetization of the medium, and can be generally classified into three types of noise: transition noise, particulate noise and modulation noise. Particulate noise refers to signal interference due to random dispersion of magnetic particles or grains in the magnetic medium. Particulate noise is stationary, meaning that it is not dependent on user data recorded on the media. By contrast, transition noise and modulation noise are both non-stationary, meaning that they depend on the user data recorded in the media, or they are pattern-dependent.

Using first order approximation, it can be shown that the power-spectral density of transition noise is proportional to the linear recording density. Hence, transition noise becomes the main barrier to achieving ultra-high area densities on the recording media.

To account for the pattern-dependence of media noise, various advanced detectors have been proposed, which modify the branch metric calculation in Viterbi detectors to account for the correlation and data dependence of the noise. Another class of detectors utilizes decision-feedback equalization (DFE) to address pattern-dependent noise. An example of such a DFE is described by A. Kavcic in an article entitled "Decision Feedback Equalization in Channels with Signal-Dependent Media Noise", published in IEEE Trans. on Magnetics, vol. 37, no. 4, July 2001, pp. 1909-1911.

All the above algorithms for combating pattern-dependent media noise can be characterized as "post-processing" architectures. In other words, these detectors presume a scenario where signals are corrupted by severe pattern-dependent correlated noise and compensate the performance loss by taking into account the pattern-dependence of the noise.

BRIEF SUMMARY OF THE INVENTION

In one embodiment, a method of decoding data involves receiving a noise corrupted signal at a bank of equalizers, each equalizer tuned to a unique bit pattern with a corresponding equalization target. Pattern dependent outputs are generated in parallel from the individual equalizers. An estimated bit sequence is calculated with a detector using the pattern dependent outputs.

In another embodiment, a method of decoding data involves processing a segment of a received signal in a bank of equalizers that are tuned to a certain bit pattern and an equalization target to produce an equalized output for each equalizer in parallel. A bit sequence is detected using a branch metric calculation to process the equalized output.

In another embodiment, a system for reading and writing information on a channel has a transceiver for reading data from the channel and for writing data to the channel. Equalizers in communication with the transceiver generate an equalized output representative of a signal read from the channel by processing the signal in parallel to one another. Each equalizer is tuned to a selected data pattern and equalization target. A detector in communication with the equalizers is adapted to detect data from the read signals.

In another embodiment, a method for detecting data involves tuning each equalizer in an equalizer bank to a unique data pattern according to a target equalization pattern. Segments of a received signal are processed with the equalizer bank to generate equalized output signals. A path metric is calculated for each possible data sequence. An estimated bit sequence is produced based on the path metric with a smallest accumulated path.

Figure 1A:
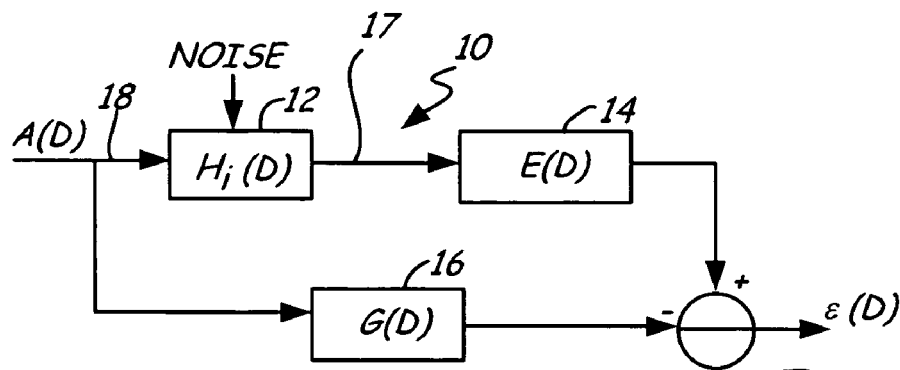
FIG. 1A is a block diagram of a conventional partial-response maximum-likelihood equalization system.

While the above-identified illustrations set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Conventional partial-response maximum-likelihood (PRML) systems typically use a single linear equalizer to shape the overall channel response to a desired partial-response (PR) target prior to sequence detection. The original data symbols then are recovered from the equalized samples. However, recording channels are indeed signal or pattern-dependent channels. Consequently, in principle, to realize perfect PR equalization, the equalizer should be pattern-dependent as well. The present invention uses a filter bank for equalization, where each filter (equalizer) is tuned to a specific data pattern (hence the name pattern-dependent equalization). Since the user data is unknown and to be recovered, the detection device is modified so that the output from the equalizer bank can be effectively utilized. The system and method of the present invention offer consistent signal-to-noise ratio (SNR) gains over conventional equalization methods for media noise dominated channels, such as recording channels.

Thus, pattern-dependent equalization (PDEQ) is motivated by the observation that recording channels are data-dependent. Specifically, the amount of ISI is related to the density of data written to and read from a recording channel. Considering a simplified linear superposition model for recording channels, the user bits are denoted as $a_k$, the pulse response of the recording channel is denoted as $g(\cdot)$, and electronic noise is denoted as $e(t)$, the readback signal $r(t)$ can be represented as $$r(t) = \sum_k a_k g_k(a_{k-1}^{k+1}, t) + e(t)$$

where $a_{k-1}^{k+1}$ denotes the bit sequence $\{a_{k-1}, a_k, a_{k+1}\}$ and $$g_k(a_{k-1}^{k+1}, t) = h\left(t - kT + \frac{|a_k - a_{k-1}|}{2}\Delta t_k, w + \frac{|a_k - a_{k-1}|}{2}\Delta w_k\right) - \qquad (1)$$
$$h\left(t - (k+1)T + \frac{|a_{k+1} - a_k|}{2}\Delta t_{k+1}, w + \frac{|a_{k+1} - a_k|}{2}\Delta w_{k+1}\right)$$

In this case, the transition response is $h(t)$; the transition jitter is $\Delta t_k$; and $\Delta w_k$ is the random pulse broadening effect.

From the equation for the readback signal $r(t)$, it can be seen that the superposition model assumes the recording channel is a random channel, which depends on the user data (ak). In addition to the recording channel appearing to be a random channel. Recording channels operating at high densities experience phenomena like data-dependent nonlinearity and asymmetry, which also make the recording channel appear to be data dependent.

To reduce the complexity requirement for detection algorithms, equalization can be applied to shorten the ISI. Conventionally, equalizers are designed to estimate an equalization target. A conventional optimization system 10 is shown in FIG. 1a.

In FIG. 1a, the system 10 has a channel equalizer 14 (denoted as E(D)), an equalization target 16 (denoted as G(D)) on a communication channel 12 (shown as $H_i(D)$), and user bits A(D) (e.g. data pattern 18) and an output error sequence $\epsilon(D)$ at the input and the output, respectively. The output error sequence $\epsilon(D)$ may also be referred to as equalization noise $\epsilon(D)$. All of the elements of FIG. 1a are shown in the D-domain. The subscript i in channel $H_i(D)$ denotes the binary sequence of the data-pattern. In the most general form, assuming n is the data length, i will range from 1 to $2^n$, corresponding to every possible binary sequence.

As shown, user bits A(D) are placed on the communication channel 12. The data pattern 18 represents the user bits A(D) on the communication channel 12. A channel equalizer 14 (typically a finite impulse response filter) filters the received signal 17 to minimize the equalization noise $\epsilon(D)$. The equalization target 16 is an idealized function, which may or may not exist, but which represents a target for the channel equalizer 14. Specifically, the ideal output of the channel equalizer 14 should be equal to the output of the target function 16, such that subtraction of the ideal output from the filtered output results in a minimized error, such that the equalization noise $\epsilon(D)$ is approximately zero.

An often-used optimization criterion is minimum mean-square error (MMSE), which minimizes the variance of the equalization noise ϵ(D). In other words, the channel equalization 14 (E(D)) and the target 16 (G(D)) are solutions to the following equation:

$$\{E(D), G(D)\} = \arg\min_{E(D), G(D)} E\{\epsilon_k^2\}$$

where $\epsilon_k$ is the error sequence corresponding to ϵ(D) in the time domain. Since the channel 18 ($H_i(D)$) is data-dependent, while the channel equalizer 14 (E(D)) and the equalization target 16 (G(D)) are not data dependent, the conventional system 10 cannot consistently realize optimal equalization. For example, consider the residual ISI, given by A(D)[$H_i(D)$ E(D)−G(D)], where A(D) is the user data sequence. Since $H_i(D)$ depends on the user data, no non-trivial solutions exist for E(D) and G(D) to eliminate completely the residual ISI for random user data input.

Figure 1B:
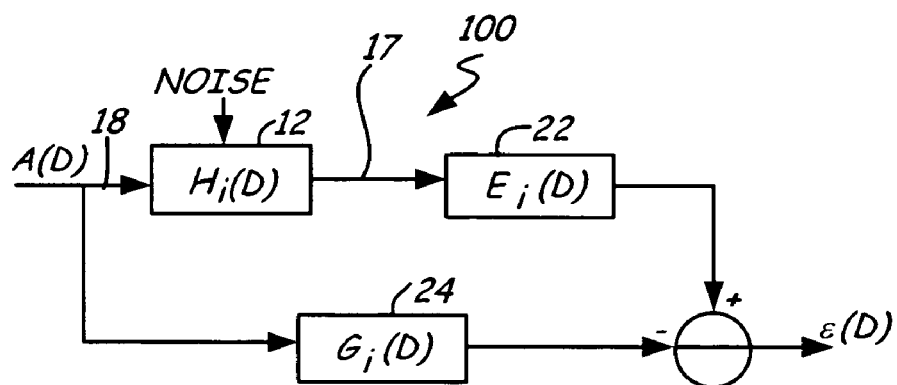
FIG. 1B is a block diagram of a pattern-dependent equalization system for a pattern dependent channel.

The present invention, as shown in FIG. 1b, relaxes the restrictions on E(D) and G(D), allowing E(D) and G(D) to be data-dependent. As shown, the system 100 of the present invention has a channel 18 (denoted as $H_i(D)$), a channel equalizer 22 (denoted as $E_i(D)$), an equalization target 24 (denoted as $G_i(D)$), and user bits A(D), and an equalization noise ϵ(D) at the input and the output, respectively. As in the previous figure, all of the elements of FIG. 1b are shown in the D-domain. The subscript i denotes the binary sequence of the data-pattern, and more importantly, the subscript indicates the data dependence of the channel equalizer 22 and the equalization target 24. In the most general form, assuming n is the data length, i will range from 1 to $2^n$, corresponding to every possible binary sequence.

Due to the data dependence of the equalizer 22 and the target 24, it is possible to reduce consistently the equalization noise ϵ(D) (noise seen by the detector). By making the channel equalizer 22 and the equalization target 24 data-dependent, the resulting equalization noise ϵ(D) is more consistent and less data-pattern dependent. The system 100 may be described as pattern-dependent equalization (PDEQ) and detection, in part, because the system 100 adapts to the data pattern of the user input A(D).

Figure 2:
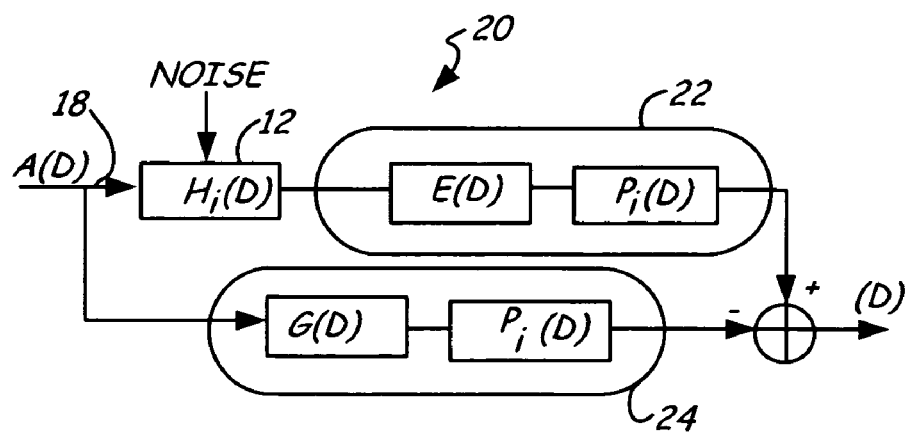
FIG. 2 is a schematic block diagram of a pattern-dependent noise-predictive detection system, which is a special case of the system of FIG. 1B.

FIG. 2 illustrates an embodiment of the present invention utilizing pattern-dependent noise-predictive (PDNP) detection. Traditionally, PDNP detection uses whitening filters to un-correlate noise by modifying the detector, which results in reduced noise seen by the detector. In particular, PDNP takes into account the pattern-dependence of the noise and thus uses different whitening filters corresponding to different data patterns for more efficient noise reduction. As shown, the system 100' implemented with PDNP detection has a channel equalizer 22 (denoted as $E'_i(D)$), an equalization target 24 (denoted as $G'_i(D)$) on a communication channel 12 (denoted as $H_i(D)$), and user bits A(D) and an equalization noise ϵ(D) at the input and the output, respectively. The channel equalizer 22 has a data independent equalizer E(D) coupled with a pattern-dependent noise whitening filter (denoted as (1−$P_i(D)$) and shown in phantom to indicate that the block does not exist in reality). The effective equalizer function is as follows:

$$E'_i(D) = E(D)(1 - P_i(D)),$$

while the effective target is $$G'_i(D) = G(D)(1 - P_i(D)).$$

Here, the noise whitening filters in both the target function and the equalizer function are pattern-dependent. Thus, a PDNP detector may be implemented as a special case of the pattern dependent equalization system 100 according to the present invention where the target and equalizer share the same pattern-dependent factor.

Figure 3:
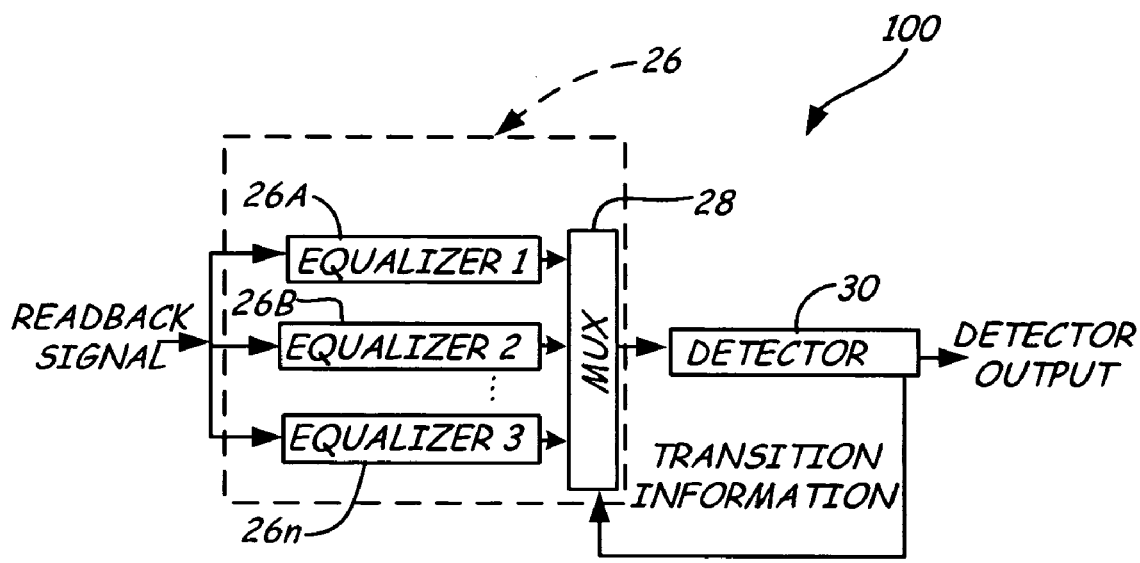
FIG. 3 is an expanded block diagram of the pattern dependent equalization system of FIG. 1B.

FIG. 3 depicts a general embodiment of the system 100 for pattern-dependent equalization (PDEQ) and detection, which differs from conventional PRML systems at the equalization stage. Specifically, instead of applying a single equalizer as in conventional PRML systems, the PDEQ system 100 employs a finite impulse response equalizer/filter-bank 26 and a multiplexer 28, in advance of the detector 30. As shown, the readback signal (e.g. the output of the $H_i(D)$ block of FIGS. 1a, 1b, and 2) is fed into the channel bank 26. Each equalizer (26A, 26B, . . . 26n) in the equalizer bank 26 generates an output, which is passed to a multiplexer 28. The multiplexer 28 produces a single output, representative of the outputs of each of the equalizers of the equalizer bank 26, and passes the single output to the detector 30, which detects the signal to generate a detector output. Transition information derived from the signal is fed back from the detector 30 to the multiplexer 28. The feedback of transition information to the multiplexer 28 allows for improvement of the overall performance of the channel equalizer 22.

In general, the recording channel response depends on the complete input bit sequence, which implies that the number of equalizers required by PDEQ system 100 grows exponentially as the length of user data A(D) increases. In practice, the pattern-dependence of the system 100 is restricted to a finite segment of bit sequence $a_{k-M_2}, a_{k-M_2+1}, \ldots, a_{k+M_1}$, denoted by $a_{k-M_2}^{k+M_1}$.

In this embodiment, the variable $a_k$ refers to the current bit, and variables $M_1$ and $M_2$ are assumed to take nonnegative integer values. The scheme of this embodiment requires $2^{M_1+M_2+1}$ distinct equalizers. Each individual equalizer (26A, 26B, . . . 26n) is then tuned to a certain bit-pattern along with the bit pattern's associated equalization target $G_i(D)$. For example, assuming $M_1=1$ and $M_2=1$, then there are a total of $2^3$ equalizers (8 equalizers). The first equalizer 26A is optimized to the bit pattern (000). The pattern is indicated to be in NRZ format, where the (000) pattern corresponds to the input sequence $(a_{k-1}\, a_k\, a_{k+1})=(-1\ -1\ -1)$. The second equalizer 26B is optimized to the bit pattern (001) corresponding to data bits $(a_{k-1}\, a_k\, a_{k+1})=(-1\ -1\ 1)$, and so on. In one embodiment, for example, the equalizers 26A, 26B, . . . 26n are optimized using a minimum mean square error (MMSE) technique. If adaptive algorithms (e.g., Least-Mean-Square) are used, the equalizers can be trained "on the fly", meaning that the equalizers can be trained during actual use.

More specifically, referring to FIG. 3, each equalizer (26A, 26B . . . , 26n) is optimized for a specific data pattern, which is determined by the following data pattern:

$$a_{k-M_2}^{k+M_1} \triangleq \{a_{k-M_2}, a_{k-M_2+1}, \ldots, a_{k+M_1}\}$$

Here, the term $a_k$ represents the user bits, and the subscript k denotes the time instance. For example, user bit $a_k$ represents the user bit at time k.

Figure 4:
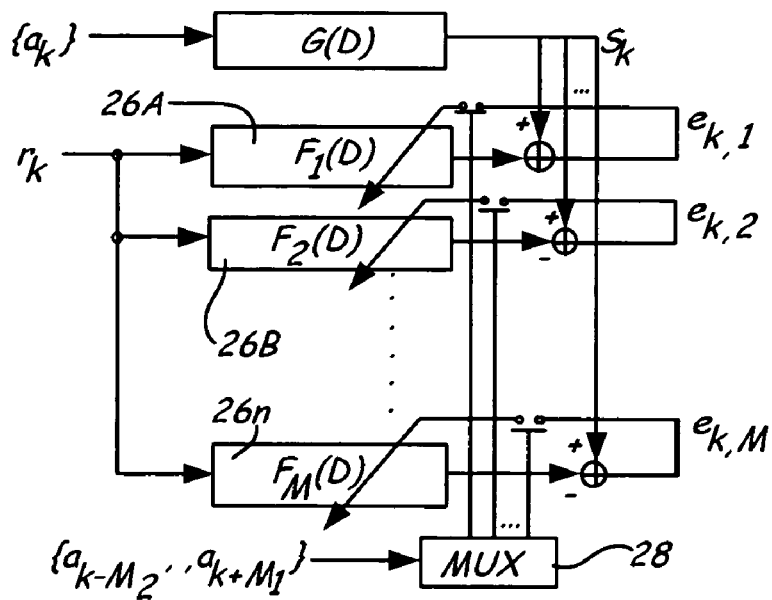
FIG. 4 is a schematic block diagram illustrating the adaptive training process for a bank of pattern-dependent equalizers.

FIG. 4 provides an example of equalizer training using the least-mean-square (LMS) method. As shown, all of the equalizers 26A, 26B, . . . 26n share the same target function 16 (denoted as G(D)). For each equalizer 26, an error signal $e_{k;i}$ is generated. The error signal $e_{k;i}$ represents the difference between the desired signal $S_k$ and the equalized sample. The error signal $e_{k;i}$ is fed back to the equalizer 26 to adjust the equalizer to minimize the error signal $e_{k;i}$. However, at each bit interval, only the equalizer corresponding to the current bit-pattern $\{a_{k-M_2}, \ldots, a_{k+M_1}\}$ is adjusted.

Figure 5A:
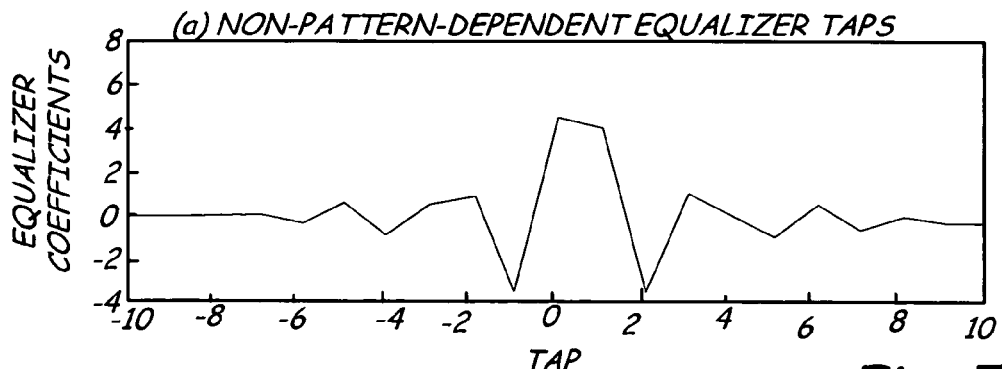
FIG. 5A is a graph of equalizer coefficients versus taps for a conventional PRML equalizer for a PR2 [1 2 1] target, trained at a signal-to-noise ratio (SNR) of 35 dB for a perpendicular channel operating at a normalized density of 2.5 with 10% jitter noise.
Figure 5B:
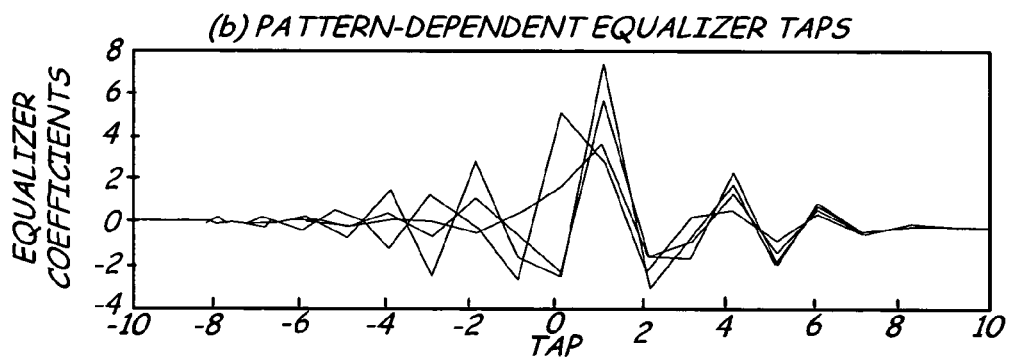
FIG. 5B is a graph of equalizer coefficients versus taps for a pattern-dependent equalizer for a PR2 [1 2 1] target, trained at a signal-to-noise ratio (SNR) of 35 dB for a perpendicular channel operating at a normalized density of 2.5 with 10% jitter noise.

FIGS. 5A and 5B illustrate the training results of a conventional PRML equalizer for a PR2 [1 2 1] target and a PDEQ system 100 of the present invention for a PR2 [1 2 1] target with $M_1=1$ and $M_2=1$, respectively. In both instances, the equalizers are trained at a Signal-to-Noise Ratio (SNR) of 35 dB for a perpendicular channel operating at a normalized density of 2.5 with 10% jitter noise. The transition response of the perpendicular channel is assumed to be the error function.

The electronic signal-to-noise ratio (SNR) is defined as $$SNR = 10 \log_{10} \frac{Q_0}{N_0}$$

where $Q_0$ is the energy of the channel impulse response, and $N_0$ is the power spectral density height of the additive white Gaussian noise. Jitter noise is specified by the percentage of the standard deviation of the transition jitter ($\Delta t_k$), which is assumed to be Gaussian-distributed in terms of the bit interval T. When media noise is severe, equalizers for different patterns differ considerably.

Figure 6:
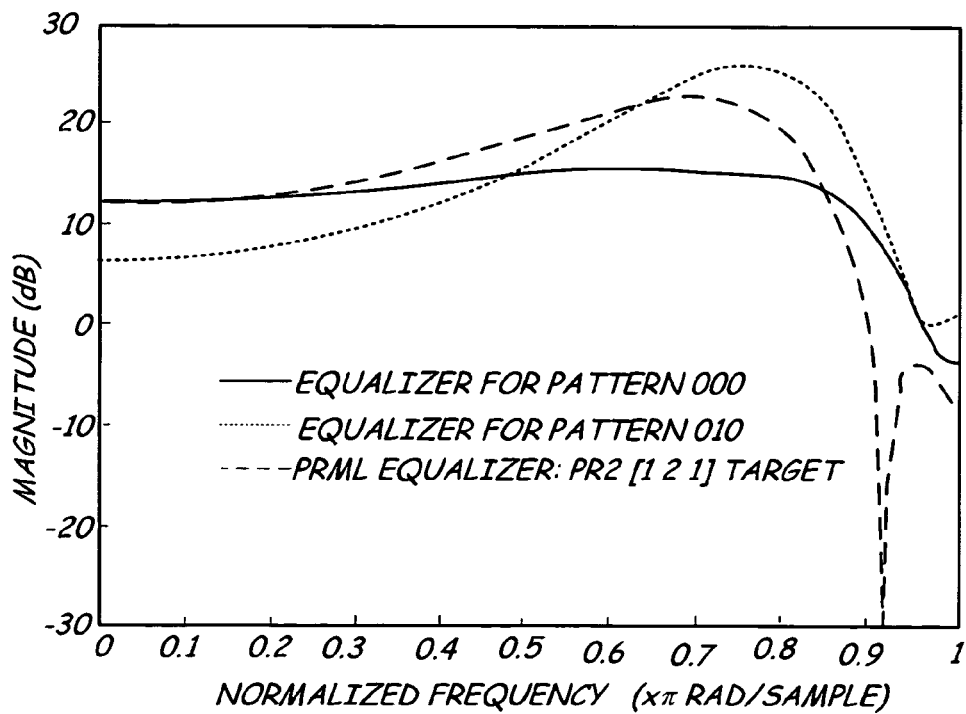
FIG. 6 is a graph of the frequency responses for equalizers optimized for patterns 000 and 010 (NRZ format) and trained at 35 dB for a perpendicular channel operating at a normalized density of 2.5 with 10% jitter noise.

To gain further insight into the characteristics of these equalizers, FIG. 6 illustrates a graph of the noise power amplitude versus the normalized frequency for equalizers optimized for the following data patterns: 000 and 010 (NRZ format). The PRML equalizer PR2 [1 2 1] target is also shown. As shown, the equalizer corresponding to the 010 pattern has a higher attenuation in low-frequency region than both the equalizer corresponding to 000 pattern and the PRML equalizer. The higher attenuation for the 010 pattern is expected since 010 pattern implies transitions both before and after the current bit, while 000 pattern corresponds no transitions. It is known that jitter noise contains a significant low-frequency component, and that to suppress the stronger jitter noise component, higher attenuation in the low frequency region is required for the equalizer corresponding to 010 pattern. Similarly, since the PRML equalizer can be deemed as an ensemble average of the pattern-dependent equalizers, it is not surprising that its low-frequency attenuation lies between that of the 000 equalizer and 010 equalizer.

Since the conventional detector is designed to cultivate an average sense of the received signal, it may be desirable to modify the detection structure to allow the detector to decide which output of the equalizers should be used for data detection. For the purpose of this discussion, it is assumed that the detector is a trellis-based detector, such as the Viterbi algorithm or the BCJR algorithm. However, similar techniques may also be applied for other types of sequence detectors, such as a fixed-delay tree search (FDTS) algorithm.

The output from the equalizer consists of a total of $2^{M_1+M_2+1}$ samples corresponding to each time instance. The equalizer output (denoted as $Y_n$) is defined by the following matrix equation:

$$Y_n = \begin{bmatrix} y_{11} & y_{21} & \cdots & y_{n1} \\ y_{12} & y_{22} & \cdots & y_{n2} \\ \vdots & \vdots & \ddots & \vdots \\ y_{1M} & y_{2M} & \cdots & y_{nM} \end{bmatrix}$$

where $M=2^{M_1+M_2+1}$ is the total number of equalizers applied. In the $Y_n$ matrix above, the first subscript denotes the time instance, and the second subscript corresponds to the equalizer index. For example, $y_{23}$ represents the equalized sample from the third equalizer at time instance 2.

Assuming the input data sequence is known, it is possible to form an ideally equalized sequence by selecting the output from the equalizer corresponding to the current bit-pattern. For example, if the input bit sequence is $\{-1; 1; -1; 1; 1; \ldots\}$ and if $M_1=M_2=1$, then we can form the ideal sequence as $\{y_{01}; y_{12}; y_{25}; y_{33}; \ldots\}$. It should be expected that such a sequence contains less noise than the equalized sequence by a single equalizer in PRML systems.

Figure 7:
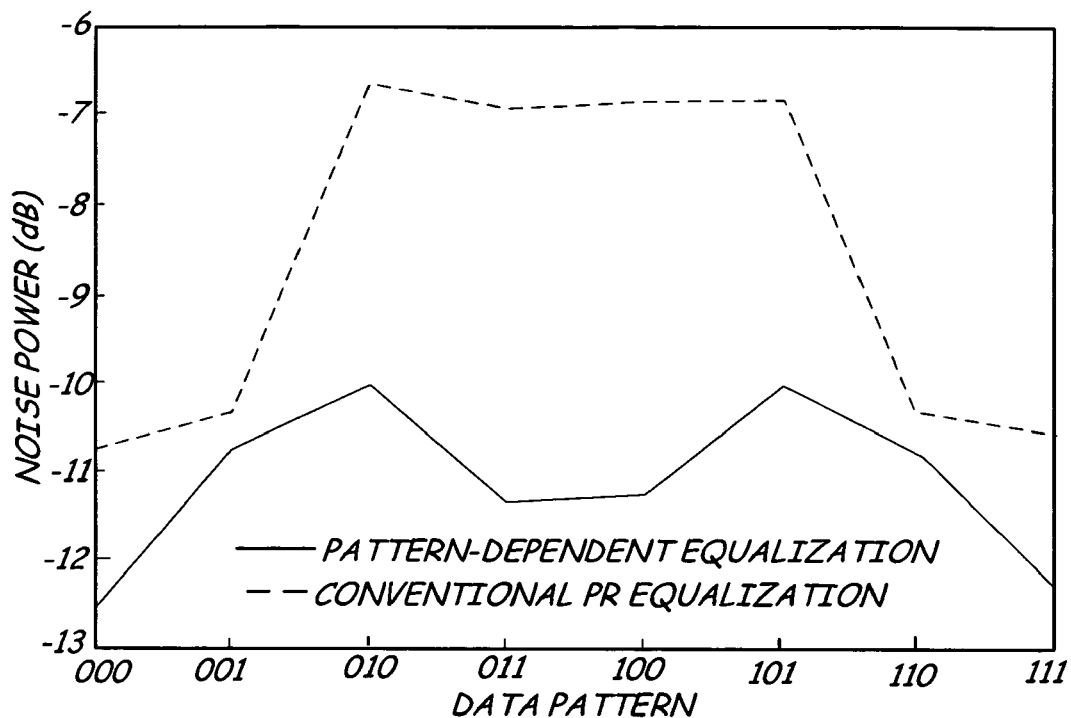
FIG. 7 is a graph of the noise power versus the data pattern of a conventional equalization system and a pattern dependent equalization system on a perpendicular channel operating at a normalized density of 2.5 with 10% jitter noise.

FIG. 7 illustrates the noise variance of different data patterns for the pattern dependent equalization technique of the present invention as compared with conventional partial response (PR) equalization. Once again, the channel is a perpendicular recording channel operating at a normalized density of 2.5 with 10% jitter noise. The noise power level is measured at an eSNR of 35 dB. As shown, the PDEQ equalization technique results in considerable noise reduction as compared with the conventional PR equalization technique. In addition to overall noise reduction, the noise pattern-dependence also diminishes.

In practice, the input sequence is unknown. To exploit the parallel outputs from the equalizer bank 26, it is necessary to modify the succeeding sequence detector 30, accordingly. The detector 30 can be any type of sequence detector, including the Viterbi detector and its variants, the BCJR algorithm and its variants, and including fixed-delay tree search (FDTS) detection schemes.

Generally, the Viterbi algorithm computes hard decisions by performing maximum-likelihood decoding. By contrast, the BCJR algorithm computes soft information about the message in the form of a posteriori probabilities for each of the message bits.

Trellis-based detectors use the equalized samples of the user bits to compute branch metrics for each transition in the trellis and for every time instance. In order to utilize the output from the equalizer bank 26, the trellis must be set up properly such that each transition is associated with sufficient bits to determine the desired signal and to identify the equalization pattern $$a_{k-M_2}^{k+M_1}.$$

Thus, the number of states required is $2^{M_1+max(I,M_2)}$, where I is the inter-symbol interference (ISI) length (i.e. target length−1). For each transition, the branch metric is calculated using the equalized sample from the equalizer bank 26, and more specifically from the equalizer (26A, 26B, ... 26n) whose pattern corresponded to the equalization pattern identified by the current transition. For each transition in the trellis, the multiplexer 28 provides the detector 30 with the equalization output from the equalizer 26 that corresponds to the transition.

For the purpose of the following discussion, a Viterbi detector is used. The Viterbi algorithm is a maximum-likelihood sequence detector. Briefly, the Viterbi algorithm finds the most probable input data sequence corresponding to the received signals through dynamic linear programming (e.g. trellis computation). For a received sequence ($y_n$) corrupted by additive white Gaussian noise (AWGN), the Viterbi algorithm calculates a path metric corresponding to every path in the trellis according to the following equation (where $P_n$ is the path metric at time n:

$$P_n = \sum_{i=1}^{n} \lambda_i(S_j, S_k) = \sum_{i=1}^{n} [y_i - o_i(S_j, S_k)]^2,$$

where $S_j$ and $S_k$ denote the j-th and k-th state in the trellis, respectively; and where $o_i(S_j, S_k)$ is the noise-free partial response signal, determined by the transition $S_j \rightarrow S_k$.

For a PR2 [1 2 1] channel, the noise-free partial response signal ($o_i(S_j,S_k)$) is equal to $a_i + 2a_{i-1} + a_{i-2}$. The Viterbi algorithm then chooses the path with the smallest accumulated path metric as the survivor, and subsequently produces an estimated bit sequence.

To utilize the pattern-dependent equalized output, the branch metric calculation for $\lambda_i$ above can be modified as follows:

$$\lambda_i(S_j, S_k) = [y_i(S_j, S_k) - o_i(S_j, S_k)]^2,$$

where $y_i(S_j, S_k)$ denotes the received signal sample at time i. Additionally, the term "$y_i$" represents one of the M equalizer outputs at time i, which is further determined by the bit-pattern corresponding transition $S_j \rightarrow S_k$. For example, assuming $M_1=0$ and $M_2=1$ for a PR2 channel, the transition from state $S_0$ to the same state $S_0$ corresponds to the bit-pattern "00", and thus the output from the first equalizer 26A is chosen, i.e., $y_i(S_j, S_k) = y_{i1}$. In general, the number of trellis states required in VA is $2^{M_1 + max(I; M_2)}$, where I is the inter-symbol interference length (i.e., target length–1). When $M_1$ equals zero and $M_2$ is less than I (which is typically the case), the modified Viterbi detector 30 has the same number of trellis states as a conventional PRML Viterbi detector.

Figure 8:
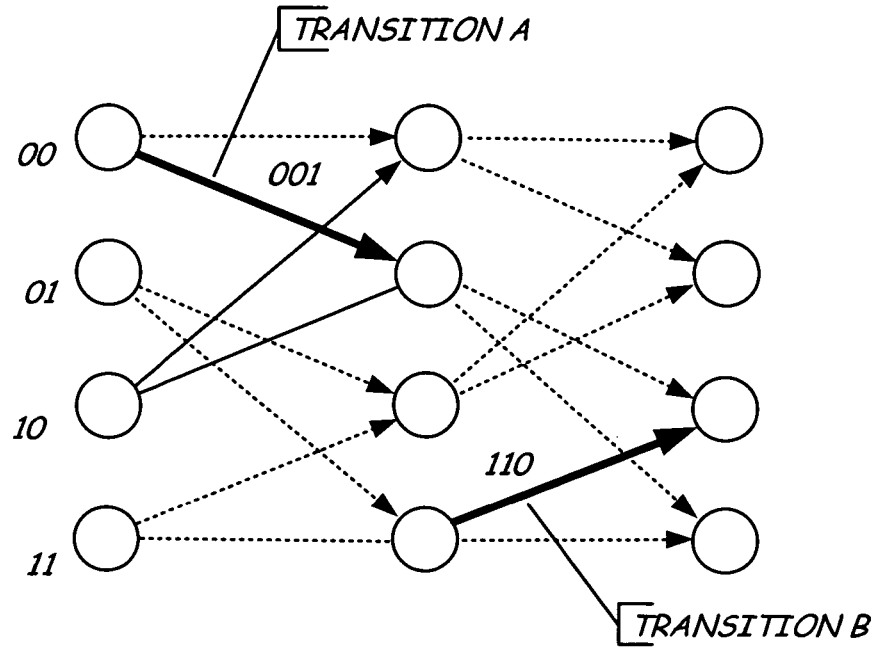
FIG. 8 is schematic diagram of a trellis for a PR4 channel.

FIG. 8 provides a more specific example of the operation of the system of the present invention. Considering a PR4 [1 0 –1] channel, the equalization pattern is defined by $a_{k-1}^k$, i.e., $M_1=0$ and $M_2=1$. In this instance, four equalizers (($2^{M_1+M_2+1}=4$)) are necessary. These equalizers 26 are optimized for the data patterns $(a_{k-1} a_k) = \{00; 01; 10; 11\}$, respectively. For the PR4 target, the trellis in the detector has $2^{0+max(2:1)} = 4$ states (as shown in FIG. 8). Now, consider the branch metric calculation for transition A from the 00-state to the 01-state. The bits associated with transition A are $(a_{k-2} a_{k-1} a_k) = \{001\}$ and the corresponding equalization pattern is $\{a_{k-1} a_k\} = (01)$. This implies that for transition A, the second equalizer output should be used. Similarly, for transition B, the output from the third equalizer should be used, which corresponds to the equalization pattern $(a_{k-1} a_k) = (10)$. Conceptually, the multiplexer for such a channel is controlled by the inputs $(a_{k-1} a_k)$, which are determined by the transition in the trellis. According to the input bits $(a_{k-1} a_k)$, the multiplexer chooses the corresponding output from the equalizer, and provides the output to the detector 30. For example, if $(a_{k-1} a_k) = (00)$, the multiplexer 28 chooses the output from the first equalizer 26A. If $(a_{k-1} a_k) = (01)$, the multiplexer 28 chooses the second equalizer output 26B; and so on.

Figure 9:
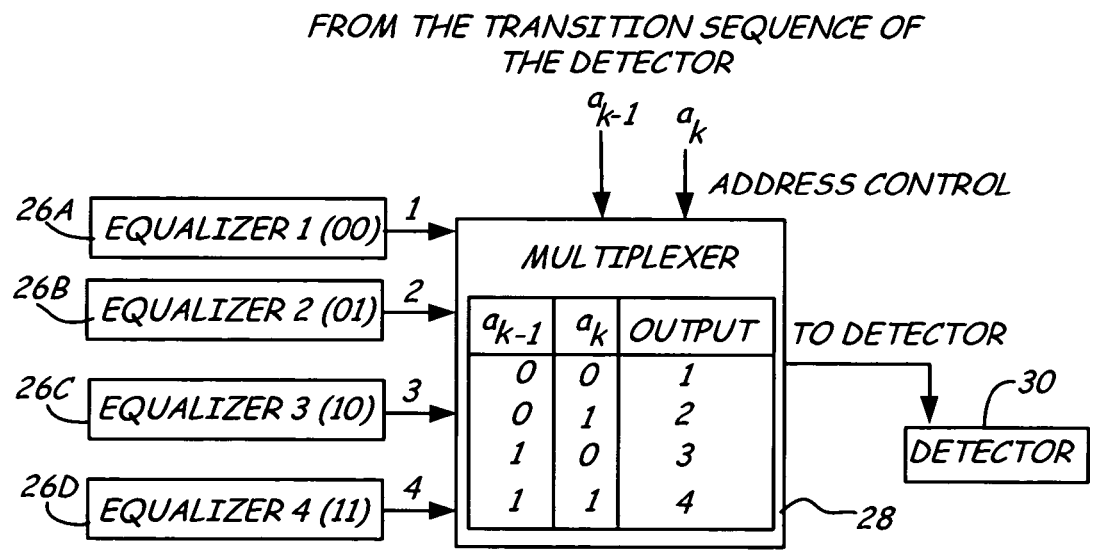
FIG. 9 is a block diagram of an embodiment of a multiplexer structure according to the present invention.

FIG. 9 illustrates one possible trellis structure having 4 equalizers 26A, 26B, 26C, 26D representing the four input states {00, 01, 10, 11}, respectively. The equalizers 26A, 26B, 26C, and 26D pass the equalized output to the multiplexer 28 which utilizes transition data from the detector 30 to transmit the appropriate output corresponding to the input data to the detector 30.

Figure 10:
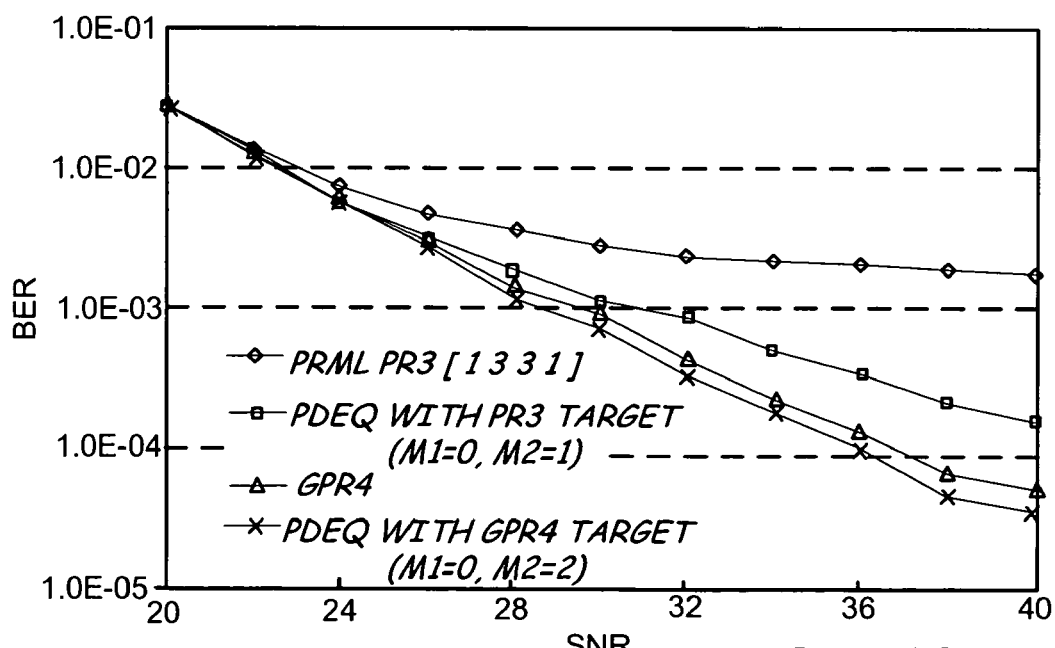
FIG. 10 is a graph of the bit error rate (BER) versus the signal-to-noise ratio (SNR) of a pattern-dependent equalization system on a perpendicular channel operating at a normalized density of 2.5 with 10% jitter noise.
Figure 11:
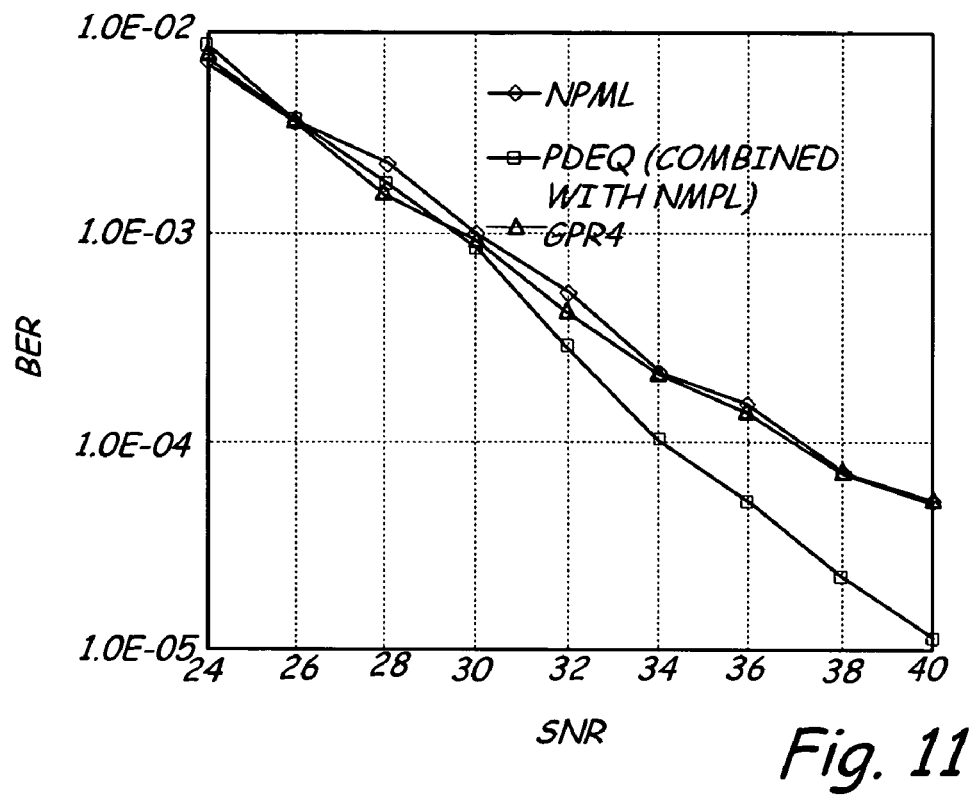
FIG. 11 is a graph of the BER versus SNR for a pattern-dependent equalization system combined with noise-predictive maximum likelihood detection on a perpendicular channel operating at a normalized density of 2.5 with 10% jitter noise.
Figure 12:
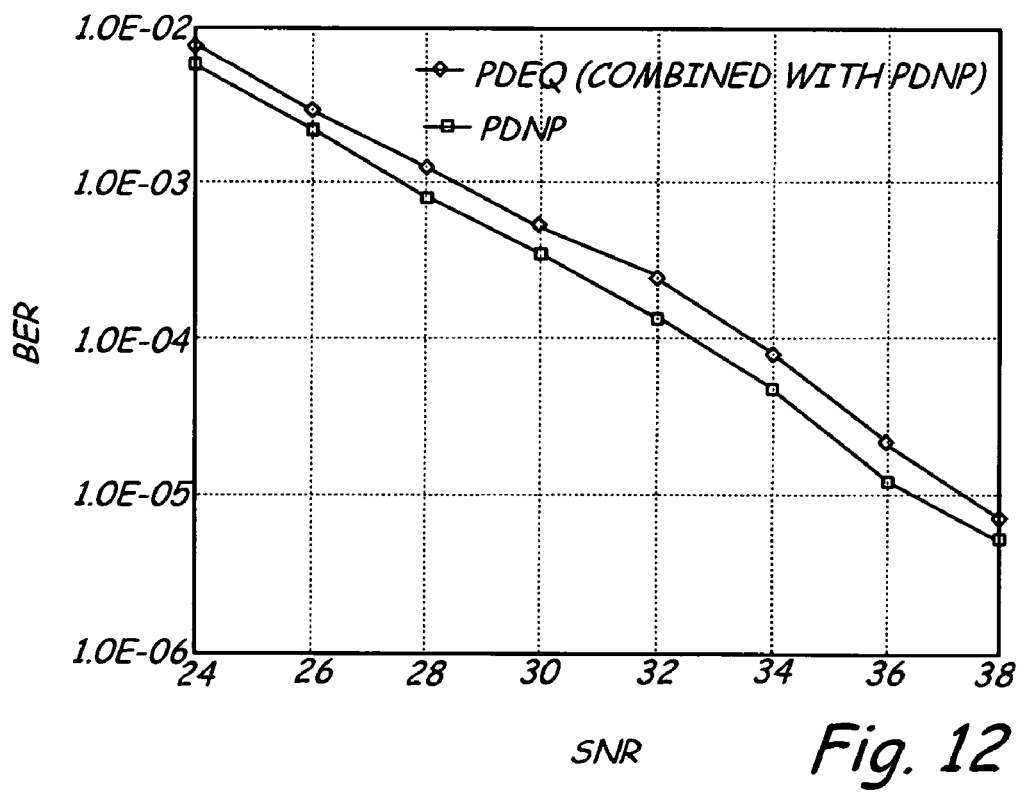
FIG. 12 is a graph of the BER versus SNR for a pattern dependent equalization system with pattern-dependent noise-predictive (PDNP) detection on a perpendicular channel operating at a normalized density of 2.5 with 10% jitter noise.

FIGS. 10-12 illustrate the performance of pattern-dependent equalization (PDEQ) in various operating scenarios. In each instance, the graphs represent the performance of the PDEQ system 100 on a perpendicular recording channel operating at a normalized density of 2.5 with 10% jitter noise. While the graphs and the discussion above has been focused toward perpendicular recording channels, similar results are obtained with longitudinal channels.

FIG. 10 illustrates the bit-error rate (BER) relative to the SNR for for pattern-dependent equalization with Viterbi detection. When media noise is severe, the pattern-dependent equalization technique of the present invention produces consistent SNR gains for both PR3 and GPR4 targets. In terms of detector complexity (e.g. number of trellis states), all three cases shown in FIG. 8 require eight trellis states.

As mentioned previously, the pattern dependent equalization technique of the present invention can be easily integrated into or used with other existing sequence detectors 30 for additional SNR improvement. FIG. 9 illustrates an embodiment of the PDEQ system 100 with noise-predictive maximum-likelihood (NPML) detection. The NPML detection scheme basically implements a noise-whitening filter inside the Viterbi detector 30 to account for the noise correlation resulting from equalization. In FIG. 9, the PDEQ system 100 was implemented with a 5-taps whitening filter and without decision-feedback. The PR target for the NPML is PR2 [1 2 1]. Hence, the number of states required in the Viterbi detector is $2^{2+4} = 64$.

FIG. 11 shows the performance of the PDEQ system 100 combined with NPML detection. For reference purposes, the BER curve for NPML detection and GPR4 targets are also plotted in the figure. The pattern-dependent equalizers share the same PR2 target, and M1=M2=1, implying a 128-state trellis combined with NPML. It is possible to reduce the state trellis to 64 states by decision-feedback, without incurring noticeable performance loss. As shown, the PDEQ system with NPML detection enjoys a considerable performance gain over conventional NPML detector.

FIG. 12 illustrates the performance of the PDEQ system 100 combined with pattern-dependent noise-predictive (PDNP) detection. Pattern-dependent noise-predictive (PDNP) detection is a more complex algorithm than the NPML detection algorithm. PDNP is based on noise prediction. In PDNP, the noise whitening filters in the Viterbi detector are pattern-dependent. As explained above with respect to FIG. 2, PDNP is a special case of PDEQ where the equalizer and the target share the same pattern-dependent component.

For PDNP, the noise whitening filter has 5 taps, and a total of 32 predictive-filters are employed. For the PDEQ system 100 with PDNP detection, the parameters are $M_1 = M_2 = 1$, and the equalizers share the same PR2 [1 2 1] target. As before, the PDEQ system 100 with PDNP detection experiences consistent gains over the PDNP detector by itself.

As discussed above, the pattern dependent equalization (PDEQ) technique of the present invention improves the received signal prior to detection by the detector. The PDEQ system 100 of the present invention is intended for use in any channel, and in particular, for use in media-noise dominated recording channels (such as magnetic and/or optical recording systems). In contrast to convention PRML systems where one single equalizer is employed for channel equalization, the PDEQ system 100 employs multiple equalizers in order to reduce the noise seen the detector 30.

The PDEQ system can be easily integrated into existing detection circuits or added to systems before the detection circuit to provide consistent SNR gains over conventional partial-response (PR) equalization systems. While the data presented illustrates PDEQ performance with the same target, it should be understood that the target may be pattern-dependent as well. By making the target pattern dependent, the performance of the PDEQ system 100 may be further enhanced.

It is important to note that, in practice, timing recovery circuits typically share the same equalizer with the channel detector. If the PDEQ technique is to be applied, selected samples from the equalizer bank 26 (determined by the Viterbi output) along with temporary decisions from the Viterbi detector can be used for timing recovery purposes. Since the PDEQ system 100 provides better equalized samples and produces fewer errors, the timing recovery circuit can benefit from the PDEQ system as well.

Thus, the system 100 of the present invention utilizes pattern-dependent equalization (PDEQ) to reduce the total noise seen by the detector preceding detection, rather than compensating it in the detector. The noise reduction is achieved by modifying the equalization algorithm. Hence, SNR gains can be obtained by directly integrating PDEQ with traditional sequence detectors, such as Viterbi Algorithms. Furthermore, as the PDEQ equalizer improves the signal quality (i.e., less noise) received by the detector, the aforementioned advanced detectors, such as PDNP, see consistent signal-to-noise ratio (SNR) gains over conventional equalization algorithms.

Although the present invention has been described with reference to preferred embodiments, workers skilled in the art will recognize that changes may be made in form and detail without departing from the spirit and scope of the invention.

The invention claimed is:

1. A method of decoding data comprising:
   tuning each equalizer of a bank of equalizers to a bit pattern, wherein tuning each equalizer includes selecting an equalizer from the bank of equalizers, sending known data to the selected equalizer, calculating a difference between an output signal from the selected equalizer and a target output signal, and tuning the selected equalizer to reduce the difference;
   processing a segment of a received signal in a bank of equalizers, each equalizer tuned to a different bit pattern and an equalization target to produce an equalized output for each equalizer; and
   detecting a bit sequence using a branch metric calculation to process the equalized output.

2. The method of claim 1 wherein the step of processing comprises:
   dividing the segment of the received signal into finite overlapped segments, and
   calculating an equalized output for each of the finite segments with the bank of equalizers.

3. The method of claim 1 wherein the equalized output is used in sequence detection according to the bit pattern associated with the equalizer for each equalizer of the bank of equalizers.

4. The method of claim 1 wherein a number of equalizers in the bank of equalizers is determined by a maximum number of possible states for a selected pattern window.

5. The method of claim 1 wherein the branch metric calculation is a square of a difference between a received signal sample and a desired target signal determined by a state transition.

6. The method of claim 1 wherein the equalization target is pattern-dependent.

7. The method of claim 1 wherein the branch metric calculation is based on a noise whitening principle when noise in the received signal is correlated.

8. The method of claim 1 branch metric calculation is based on a covariance matrix of noise when noise in the received signal is correlated.

* * * * *

UNITED STATES PATENT AND TRADEMARK OFFICE
CERTIFICATE OF CORRECTION

| | |
|---|---|
| PATENT NO. | : 7,599,450 B2 |
| APPLICATION NO. | : 10/771813 |
| DATED | : October 6, 2009 |
| INVENTOR(S) | : Yang et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 956 days.

Signed and Sealed this

Twenty-eighth Day of September, 2010

David J. Kappos
*Director of the United States Patent and Trademark Office*